(12) United States Patent
Greager et al.

(10) Patent No.: US 11,834,614 B2
(45) Date of Patent: Dec. 5, 2023

(54) GASIFICATION PROCESS

(71) Applicant: Velocys Technologies Ltd, Oxford (GB)

(72) Inventors: Ivan Philip Greager, Houston, TX (US); Roger Allen Harris, Houston, TX (US); Rudolph Havenga, Berkshire (GB); Neil Alexander King, Oxford (GB)

(73) Assignee: Velocys Technologies Ltd, Oxford (GB)

( * ) Notice: Subject to any disclaimer, the term of this patent is extended or adjusted under 35 U.S.C. 154(b) by 17 days.

(21) Appl. No.: 17/506,240

(22) Filed: Oct. 20, 2021

(65) Prior Publication Data

US 2022/0119715 A1 Apr. 21, 2022

Related U.S. Application Data

(60) Provisional application No. 63/094,643, filed on Oct. 21, 2020.

(30) Foreign Application Priority Data

Nov. 12, 2020 (GB) .................................... 2017844

(51) Int. Cl.
*C10G 2/00* (2006.01)
*C10K 1/00* (2006.01)
(Continued)

(52) U.S. Cl.
CPC .................. *C10G 2/30* (2013.01); *C01B 3/40* (2013.01); *C10J 3/00* (2013.01); *C10K 1/004* (2013.01);
(Continued)

(58) Field of Classification Search
CPC ................ C01B 3/40; C01B 2203/062; C01B 2203/061; C01B 2203/1058;
(Continued)

(56) References Cited

U.S. PATENT DOCUMENTS 7,863,341 B2  1/2011  Routier
8,536,233 B2  9/2013  Rojey
(Continued)

FOREIGN PATENT DOCUMENTS

DE  3242206 A1  5/1984
EP  2487225 A1  8/2012
(Continued)

OTHER PUBLICATIONS

Combined Search and Examination Report for related Great Britain Application No. GB2017844.8 dated Mar. 5, 2021.
(Continued)

*Primary Examiner* — Jafar F Parsa
(74) *Attorney, Agent, or Firm* — Renner, Otto, Boisselle & Sklar, LLP (57) ABSTRACT

A process for the manufacture of a useful product from synthesis gas having a desired hydrogen to carbon monoxide molar ratio comprises gasifying a first carbonaceous feedstock comprising waste materials and/or biomass in a gasification zone to produce a first synthesis gas; optionally partially oxidising the first synthesis gas in a partial oxidation zone to generate oxidised synthesis gas; reforming a second carbonaceous feedstock to produce a second synthesis gas, the second synthesis gas having a different hydrogen to carbon ratio from that of the first raw synthesis gas; combining at least a portion of the first synthesis gas and at least a portion of the second synthesis gas in an amount to achieve the desired hydrogen to carbon molar ratio and to generate a combined synthesis gas and subjecting at least
(Continued)

part of the combined synthesis gas to a conversion process effective to produce the useful product.

25 Claims, 1 Drawing Sheet

(51) Int. Cl.
  *C01B 3/40* (2006.01)
  *C10J 3/00* (2006.01)
(52) U.S. Cl.
  CPC ...... *C10K 1/005* (2013.01); *C01B 2203/0233* (2013.01); *C01B 2203/0244* (2013.01); *C01B 2203/061* (2013.01); *C01B 2203/062* (2013.01); *C01B 2203/068* (2013.01); *C01B 2203/1058* (2013.01); *C01B 2203/1223* (2013.01); *C01B 2203/1229* (2013.01); *C01B 2203/1241* (2013.01); *C10G 2400/04* (2013.01); *C10G 2400/08* (2013.01); *C10J 2300/092* (2013.01); *C10J 2300/0946* (2013.01); *C10J 2300/1618* (2013.01); *C10J 2300/1659* (2013.01); *C10J 2300/1665* (2013.01); *C10J 2300/1668* (2013.01); *C10J 2300/1846* (2013.01)
(58) Field of Classification Search
  CPC ...... C01B 2203/068; C01B 2203/0244; C01B 2203/0233; C10G 2/30; C10G 2400/04
  See application file for complete search history.

(56) References Cited

U.S. PATENT DOCUMENTS

| | | | |
|---|---|---|---|
| 10,633,594 | B1 | 4/2020 | Wright |
| 2007/0100003 | A1 | 5/2007 | Holley et al. |
| 2011/0218254 | A1* | 9/2011 | Chakravarti ............ C10J 3/463 |
| | | | 518/700 |
| 2019/0118157 | A1 | 4/2019 | Chandran et al. |
| 2019/0382803 | A1 | 12/2019 | Foody |
| 2020/0071163 | A1 | 3/2020 | Foody |
| 2020/0140901 | A1 | 5/2020 | Foody et al. |
| 2020/0148964 | A1 | 5/2020 | Foody et al. |

FOREIGN PATENT DOCUMENTS

| | | |
|---|---|---|
| EP | 2350233 A1 | 9/2020 |
| JP | 2002363578 A | 12/2002 |
| WO | 2011112484 A1 | 9/2011 |
| WO | 2014056535 A1 | 4/2014 |
| WO | 2017011025 A1 | 1/2017 |
| WO | 2017039741 A1 | 3/2017 |
| WO | 2018026388 A1 | 2/2018 |

OTHER PUBLICATIONS

International Search Report and Written Opinion for related International Application No. PCT/EP2021/079176 dated Jan. 27, 2022.

* cited by examiner

GASIFICATION PROCESS

This application claims the benefit of U.S. Provisional Patent Application No. 63/094,643, filed Oct. 21, 2020, and claims priority to UK Patent Application No. GB 2017844.8, filed Nov. 12, 2020, the disclosures of which are incorporated herein by reference in their entireties.

TECHNICAL FIELD

The present invention concerns a gasification process for the production of useful products such as higher molecular weight (typically liquid) hydrocarbon products, for example synthetic fuels, from waste materials and/or biomass in combination with renewable natural gases in a manner which allows increased control over obtaining the desired molar ratio of hydrogen to carbon monoxide of a specific process in comparison with conventional processes of the type. The gasification process of the invention may also be used in the production of separation products such as hydrogen.

BACKGROUND

It is widely known in the art to manufacture useful products such as synthetic fuels from waste materials and/or biomass and/or gaseous material, such as natural gas. We may refer to such manufacturing methods as WTL (Waste-to-Liquids), BTL (Biomass-to-Liquids) and GTL (Gas-to-Liquid) processes.

Typical WTL and BTL processes involve several reactions, for example, the gasification of waste or biomass feedstock by steam reforming processes and/or partial oxidation and/or water gas shift and/or de-volatilization and/or carbon dioxide reforming and/or methanation to produce a raw synthesis gas which may then be treated and purified in various ways before entering a chemical reaction train to generate a useful product.

Typical GTL processes involve the gasification by steam methane reforming and/or autothermal reforming of natural gas feedstock to produce a raw synthesis gas which may then be treated and purified in various ways before entering a chemical reaction train to generate a useful product.

Other gasification processes known in the art include, but are not limited to, carbon dioxide reforming, pyrolysis and partial oxidation.

In the case of the useful product being a synthetic fuel (for example a drop-in synthetic fuel), the chemical reaction train will typically comprise a Fischer-Tropsch (FT) reactor. The FT process is widely used to generate fuels from carbon monoxide and hydrogen and can be represented by the equation:

$$(2n+1)H_2 + nCO \rightarrow C_nH_{2n+2} + nH_2O$$

The molar $H_2$:CO ratio is an indication of the required stoichiometry in the chemical reaction train. For an FT process the usage ratio approximates ideally to 2 when n is a large number in the above equation. For example when n=100 the ratio is 2.01. It will be appreciated that in a complex reaction network, side reactions may occur in which case the overall usage ratio and the primary reaction stoichiometry may not be synonymous and further both of these can be different from the ratio of reactants made available for the reaction. For example, in the case of FT the usage ratio in reality is typically in the range of 1.95 to 2.05, while the $H_2$:CO ratio in the feed can vary significantly.

It would be desirable to allow greater control when obtaining the molar $H_2$:CO ratio in a chemical engineering process for the production of useful products, for example synthetic fuels, from waste materials and/or biomass and/or gaseous materials in order to afford a more environmentally friendly process that preserves the biogenic content of the fuels produced and controls the overall carbon intensity of the process.

There is demand for the manufacture of a useful product, such as transportation fuel, to be produced from more environmentally friendly material.

Carbon intensity (also known as CI) is a measure of the amount of carbon used by or released from an industrial process relative to the tangible results of that process, often expressed as grams of $CO_2$ equivalent emitted per megajoule of energy produced by the process (or producible from the products of the process). The CI is a measure of the carbon intensity of the entire life cycle, from feedstock to origination to product utilisation, for example.

The term "Carbon Intensity" or "CI" may also be construed in accordance with a model based on an overall lifecycle assessment, for example forest to tailpipe. For example, GREET a publicly available spreadsheet model developed at Argonne National Laboratory (ANL) or a California-specific version of Argonne National Laboratory's GREET life cycle model used to calculate GHG emissions under the California Low Carbon Fuel Standard (LCFS) is the CA-GREET Version 3.0 (Tier 1) model. Other appropriate models are available such as the Biomethane & Biogas Carbon Calculator published by NNFCC Ltd, Biocentre, York Science Park, Innovation Way, York, YO10 5NY UK. Carbon intensity provides a measure of the overall energy efficiency of a process. Carbon intensity may be understood for example in terms of grams of $CO_2$ equivalent to per MJ of fuel produced.

It would be desirable to reduce carbon intensity in a chemical engineering process for the production of useful products, for example synthetic fuels, from waste materials and/or biomass and gaseous materials, in order to afford a more environmentally beneficial process.

The invention is concerned particularly but not exclusively with combining synthesis gas from a gasification process utilising waste and/or biomass materials as the feedstock, which tends to generate a lean hydrogen synthesis gas, with synthesis gas from a gasification process utilising gaseous materials, more preferably renewable natural gas, which tends to generate a hydrogen rich synthesis gas.

There is a demand for fuel derived from renewable resources. For example, the Renewable Transport Fuel Obligation (RTFO) currently obligates UK suppliers of road transport fuels (such as refiners and importers) in excess of 450,000 litres annually to use a certain percentage of sustainable biofuels.

The current environmental standards target in the US is that for an advanced biofuel produced in a WTL or BTL process to qualify for RINs (renewable identification number), a 60% or greater reduction in greenhouse gas emissions (measured as g$CO_2$-eq/MJ of fuel) is achieved compared to the baseline for a fuel derived from a refinery. Operationally it would be desirable to reduce the greenhouse gas emissions of any given synthetic fuel production pathway by at least 65%.

WTL, BTL and GTL processes are very well known in the art.

For example EP2350233A1 relates to a method for producing liquid hydro carbonaceous product from solid biomass, the method comprising gasifying solid biomass to produce raw synthesis gas, conditioning the raw synthesis gas to obtain purified synthesis gas and subjecting the purified gas to a Fischer-Tropsch synthesis.

WO2018026388 describes converting one or more carbon-containing feedstocks, for example plastics, agriculture residues, and forest remediation wood into hydrocarbons.

U.S. Pat. No. 10,633,594B1 describes converting natural gas to liquid fuels such as kerosene, diesel or jet fuel wherein the GTL process has two main steps: (1) the generation of the synthesis gas (syngas), and (2) the conversion of the synthesis gas into liquid fuels, such as kerosene and diesel.

Some prior art WTL, BTL and GTL processes have sought to address environmental concerns.

For example, WO2017011025A1 and WO2017039741A1 concern systems for producing high biogenic carbon concentration Fischer-Tropsch (F-T) liquids derived from municipal solid wastes (MSW), and a high biogenic content fuel derived from renewable organic feedstock sources.

US2020140901A1 describes process for using biogenic carbon dioxide derived from non-fossil organic material for producing a fuel or fuel intermediate.

US2020071163A1 describes a method for transforming waste organic material to produce a liquid transportation or heating fuel. The process aims to utilize the energy in waste organic material to increase the renewable energy content of transportation fuels used commercially in conventional automobiles and to provide a method for using renewable biomass to replace or reduce the quantity of fossil derived energy present in transportation and heating fuels.

US2019382803A1 describes the production of a fuel from cellulosic feedstock with favourable GHG emission reductions and that overcomes some of the limitations of known processes for utilizing energy and making products from such feedstocks.

US2020148964A1 describes a method and system for producing a fuel and in particular relates to a method and system for producing a fuel that includes transporting biogas from a plurality of biogas sources to a processing facility by vehicle.

US2019118157A discloses a gasification process in which synthesis gas from a plurality of gas generation systems in parallel is combined and processed to form e.g. F-T products. The gas generation systems are fed with respective streams of carbonaceous material and the resulting synthesis gas streams are reacted with steam and optionally also with an oxygen-containing gas and/or carbon dioxide, thereby altering the $H_2$:CO molar ratio. However it is not stated whether these reactions are predominantly the water gas shift reaction (in which steam reacts with carbon monoxide to generate hydrogen and carbon dioxide) or the steam-methane reaction or auto thermal reforming (both of which generate carbon monoxide).

It would appear that none of these documents provides a satisfactory means for controlling the molar hydrogen to carbon monoxide ratio using a more environmentally friendly process and reducing carbon intensity in an otherwise functional WTL, BTL or GTL process.

Other prior art processes discuss partial oxidation and/or reforming in some capacity.

DE3242206 describes a process for producing synthesis gas, wherein, in a first process step, a first coal or hydrocarbon feed is partially oxidized under pressure and formation of a first synthesis gas and, in a second process step, a second hydrocarbon feed is steam reformed under pressure and formation of a second synthesis gas, reaction heat released in the first process step being transferred to the second process step.

U.S. Pat. No. 8,536,233 describes a process for producing liquid hydrocarbons from primarily an overall feedstock that comprises one or more heavy feedstocks. The process comprises partial oxidation of the heavy feedstock, vapor reforming a light feedstock, Fischer-Tropsch conversion into hydrocarbons of a synthesis gas, and hydrocracking at least a portion of the produced hydrocarbons.

JP2002363578 describes a method for producing a hydrogen/carbon monoxide mixed gas, which comprises supplying a carbon fuel, a coal layer gas containing mainly methane, an oxidative agent and steam to a pressure gasification unit to react, wherein the coal layer gas is previously reformed to have a reduced methane content, treated to have an increased pressure and supplied to the pressure gasifying apparatus. The reformed coal layer gas and the carbon fuel are partially oxidized to produce carbon monoxide, a part of which is simultaneously applied to a shift reaction to convert to hydrogen.

US2007/100003 describes a process in which matter is first pyrolyzed and the resulting vapors are drawn off and run through the char and tar in the second stage with the process steam in a supercritical steam gasification. The resulting gases are then purified by use of an amine wash scrubber. An adiabatic pre-reformer is then employed to break down aromatic compounds. This gas is then fed to the main steam reformer, and afterwards the gas is cooled to suitable reaction temperatures for fuel synthesis.

WO2014/056535 describes a process for the production synthesis gas from Fischer-Tropsch tail gas, including autothermal reforming and shifting a portion of autothermally reformed process gas.

SUMMARY OF INVENTION

The object of the present invention is to reduce or eliminate the water gas shift reaction and its associated costly plant to provide an improved process for manufacturing a useful product such as synthetic fuel from waste materials and/or biomass materials and/or gaseous materials.

Another object of the present invention is to reduce the carbon intensity of the process in comparison to conventional processes for producing high molecular weight synthetic fuel.

A further object of the present invention is to optimize and reduce operating costs by using volume and compositional control, through controlling operating parameters and by utilising standard measuring and sampling equipment, to optimize feed ratios and utilise the most cost-effective and environmentally friendly route.

The inventors of the present invention have surprisingly found that a process according to the present invention provides an effective method for controlling the desired hydrogen to carbon monoxide ratio of the feed used to produce the useful product which is superior to conventional methods in the art. This is because the present invention uses a feed of hydrogen rich gas, preferably comprising at least one renewable material, with a feed of hydrogen lean gas, to provide the desired hydrogen to carbon monoxide molar ratio, without the need of a water gas shift reaction. Therefore, the process according to the present invention is more economic and environmentally friendly than conventional methods of the art.

According to a first aspect of the present invention, there is provided a process for the manufacture of a useful product from synthesis gas having a desired hydrogen to carbon monoxide molar ratio comprising:

gasifying a first carbonaceous feedstock comprising waste materials and/or biomass in a gasification zone to produce a first synthesis gas;

optionally partially oxidising the first synthesis gas in a partial oxidation zone to generate partially oxidised first synthesis gas;

reforming a second carbonaceous feedstock to produce a second synthesis gas, in which reforming the carbon monoxide content and the hydrogen content are both increased, the second synthesis gas having a different hydrogen to carbon monoxide ratio from that of the first synthesis gas;

combining at least a portion of the first optionally partially oxidised synthesis gas and at least a portion of the second synthesis gas in an amount to achieve the desired hydrogen to carbon monoxide ratio and to generate a combined synthesis gas; and subjecting at least part of the combined synthesis gas to a conversion or separation process effective to produce the useful product.

Preferably the step of gasifying the carbonaceous feedstock comprises gasifying the carbonaceous feedstock in the presence of steam and oxygen to produce a first raw synthesis gas having a first raw synthesis gas $H_2:CO$ ratio. Preferably the process of the invention comprises partially oxidising in the partial oxidation zone at least part of the first raw synthesis gas to produce a first equilibrated synthesis gas having a first equilibrated synthesis gas $H_2:CO$ ratio controlled to be below the usage $H_2:CO$ ratio of the conversion process. The combinatory effect of gasification followed by partial oxidation advantageously yields an equilibrated synthesis gas with a $H_2:CO$ ratio controlled to be below the usage $H_2:CO$ ratio of the conversion or separation process, as taught at least in part in our WO2021/185827. This combination permits controllability of the $H_2:CO$ ratio even when the carbonaceous feedstock is of fluctuating characteristics, and is advantageous in further combination with the step of reforming the second carbonaceous feedstock and combining the respective synthesis gases to achieve the desired $H_2:CO$ ratio in the combined synthesis gas. This is especially the case when the second carbonaceous feedstock is selected from natural gas (particularly renewable natural gas), biogas, low-carbon methanol and low carbon ethanol, affording the operator of the plant the opportunity to adjust the $H_2:CO$ ratio of the synthesis gas derived from the first carbonaceous feedstock in a reliable and predictable manner to arrive at the desired $H_2:CO$ ratio in the combined synthesis gas without adverse effect on the carbon intensity of the process as a whole.

Preferably at least a portion of one or more of the optionally partially oxidised first synthesis gas, the second synthesis gas and the combined synthesis gas is decontaminated in a clean-up zone. This step will alleviate poisoning of any catalyst utilised in a subsequent conversion process.

The conversion process will typically result in a high molecular weight (e.g. liquid) hydrocarbon whereas a separation process may be used to produce hydrogen or remove carbon dioxide, for example.

The process of the present invention is therefore configurable to control the molar $H_2$ to CO ratio of the combined synthesis gas to provide the desired molar $H_2$ to CO ratio by combining synthesis gas derived from waste and/or biomass and synthesis gas derived from a second (e.g. gaseous) feedstock. Thus, the configurability of the plant is such as to make it capable of controlling the biogenic content of the resulting product. This has the advantage that the process of producing useful products, such as transportation fuel, is optimised and reduces the complexity of the process in comparison with conventional processes of the type.

The process according to the present invention may control the biogenic content of the product.

It has been found that the process of the invention obviates or reduces the need for additional downstream processing, such as a water gas shift reaction.

The process of the invention is therefore concerned with the practicality of generating consistently and efficiently useful products from variable carbonaceous feedstocks.

For example, when renewable natural gas is used as feedstock for the reforming process, the biogenic content of the useful products (i.e. fuel) is preserved, thereby having a significant impact on carbon intensity and greenhouse gas emissions.

Preferably, the process of the present invention is a continuous process wherein carbonaceous feedstock, of whatever nature provided it is derived from waste materials and/or biomass, is continuously fed to a gasification zone for gasifying the carbonaceous feedstock.

Preferably, a carbonaceous feedstock, of whatever nature provided it is gaseous material, is continuously fed, either simultaneously or separately to a reforming unit for gasifying the carbonaceous feedstock.

The carbonaceous feedstock used as feed for the reforming unit may optionally be compositionally different to the carbonaceous feedstock feed used for the gasification zone. The term "carbonaceous feedstock" should not be taken as limiting and the skilled person would understand the differences to the carbonaceous feedstock fed the gasification zone in comparison to the carbonaceous feedstock fed to the reforming unit.

The process according to the present invention may be an integrated process.

The inventors have surprisingly found that an integrated process according to the present invention may allow for the independent operation (decoupling) of the gasification and reforming stages, thereby increasing the flexibility and reliability of the overall process.

As a result, in the case of expected or unexpected gasification interruption, the process according to the present invention allows for continuous operation through either the recycling of tail gas to the reforming unit to achieve the desired $H_2:CO$ ratio or once through operation of the synthesis unit, for example an FT unit. Both conditions may be achieved under dynamic operating conditions through feedback control loops or operator intervention, for example.

The integrated process according to the present invention may comprise at least a gasification zone and a reforming unit.

The reforming unit (e.g. SMR or ATR unit) may operate autonomously.

The process of the present invention may be workable during downtime and/or interruption in the gasification zone.

The process of the invention therefore improves the overall reliability and availability of the process.

The inventors have advantageously found that the reliability and availability of the process is improved as a result of the aforesaid integration.

The process of the manufacture of a useful product according to the present invention therefore may not be detrimentally affected by expected or unexpected gasification interruption.

At least a portion of the synthesis gas is fed into a synthesis unit. Non-limiting examples of suitable syntheses include Fischer-Tropsch, ammonia synthesis, methanol synthesis, alcohol synthesis or hydrogen production.

As a non-limiting example, it is generally needed to increase the hydrogen to carbon monoxide ratio of the synthesis gas generated from biomass or waste gasification when wanting to supply clean synthesis gas to a Fischer-Tropsch reactor. As a result, at least part of the first synthesis gas from e.g. a clean-up zone (clean synthesis gas) may be combined with at least a portion of the second synthesis gas to adjust the hydrogen to carbon monoxide ratio to the desired range.

As a non-limiting example, the molar ratio of $H_2$ to CO of the raw synthesis gas leaving the reforming unit, when the reforming unit is a steam methane reforming unit, is desirably in the range from about 2:1 to about 7:1, or preferably from about 2.5:1 to about 6.5:1, or more preferably from about 3:1 to about 6:1. The molar ratio of $H_2$ to CO in the raw synthesis gas leaving the reforming unit is referred to herein as "hydrogen rich gas".

As a further non-limiting example, the molar ratio of $H_2$ to CO in the synthesis gas leaving the reforming unit, when the reforming unit is a autothermal reforming unit, is desirably in the range from about 1.5:1 to about 4.0:1, or preferably from about 2.0:1 to about 3.0:1, or more preferably from about 2.0:1 to about 2.5:1. The molar ratio of $H_2$ to CO in the raw synthesis gas leaving the reforming unit is most preferably about 2.4:1. The molar ratio of $H_2$ to CO in the raw synthesis gas leaving the reforming unit may also be referred to as "hydrogen rich gas". The skilled person would understand the difference in the $H_2$:CO molar ratio of synthesis gas leaving a steam methane reforming unit when compared to an autothermal reforming unit.

The molar ratio of $H_2$ to CO in the raw synthesis gas may optionally be higher when leaving a reforming unit when compared to the molar ratio of $H_2$ to CO of raw synthesis gas leaving the gasification unit.

The synthesis gas produced from the second carbonaceous feedstock (i.e. gaseous material) may have a higher hydrogen to carbon monoxide molar ratio than the synthesis gas produced from the first carbonaceous feedstock (i.e. waste and/or biomass materials).

It has been found that by combining at least a portion of the high $H_2$ to CO molar ratio of the second synthesis gas (for example produced from a reforming unit) with at least a portion of the lower $H_2$ to CO molar ratio of the first synthesis gas (for example produced from waste gasification) a combined synthesis gas is produced with a desired $H_2$ to CO molar ratio for the required synthesis, for example Fischer-Tropsch synthesis.

The useful product may optionally be produced by subjecting at least part of the synthesis gas to a Fischer-Tropsch synthesis.

Synthesis reactions require specific hydrogen to carbon monoxide ratio in feed gas ("desired ratio") for optimum performance to meet process requirements, maximise conversion and product yield. As a non-limiting example, the Fischer-Tropsch synthesis feed may have a hydrogen to carbon monoxide ratio of about 2.

As a non-limiting example, the Fischer-Tropsch synthesis usage ratio may be in the range of about 1.95 to 2.05, typically about 2.

According to the embodiment relating to Fischer-Tropsch synthesis, the combined synthesis gas may be fed into a FT reactor.

The synthesis unit may be a FT unit comprising FT reactors. The FT reactors may optionally comprise microchannels. Filters may be used to remove any particulates.

The FT reactor may convert at least part of the carbon monoxide and hydrogen of the combined synthesis gas into mainly linear hydrocarbons.

The conversion of synthesis gas into liquid hydrocarbons may optionally be in the presence of a catalyst. The chain length distribution will be dependent on the properties of the catalyst used and the operating conditions.

Fischer-Tropsch reactions are exothermic and release heat that must be removed to keep the temperature of the reaction approximately constant. Localised high temperatures in the catalyst bed have been found to adversely affect the FT product mix, yield and potentially reduce catalyst life. Therefore, it is desirable to keep the temperature constant.

The temperature may be controlled by varying pressure of a steam drum associated with the FT reactor used in conjunction with circulating cooling water.

The operating temperature for the FT synthesis may be between about 125 and 350° C., between about 150 and 300° C., between about 170 and 250° C., between about 180 and 240° C. Preferably, the operating temperature is between about 180 and 240° C. for a low temperature FT technology.

The catalyst may be a metal or compounded metal catalyst with a support. In one embodiment, the metal is cobalt. The support may be made from silica and/or titania.

The catalyst may be a metal or compounded metal catalyst with a support. In one embodiment, the metal is cobalt. The support may be made from silica and/or titania.

The products that may be obtained in the FT synthesis, for example, said hydrocarbons, may include heavy FT liquid (HFTL), light FT liquid (LFTL), FT process water, naphtha, and tail gas comprising of inerts as well as uncondensed light hydrocarbons, typically C1 to C4. A part of the tail gas comprising of light hydrocarbons, C1 to C4 range, may be recycled back to the partial oxidation zone or sent to a fuel gas system.

It is desirable to upgrade the liquid hydrocarbons into a useful product.

The liquid hydrocarbons may be upgraded to make a useful product. At least part of the liquid hydrocarbons may be upgraded by at least one of hydroprocessing, hydrotreating, product fractionation, hydrocracking and/or hydroisomerisation for example.

The FT liquid upgrading unit may for example produce high quality naphtha and Synthetic Paraffinic Kerosene (SPK). Other upgraded products may for example include gasoline, diesel and waxes. The unit may for example be configured as a recycle hydrocracker.

The useful product may for example be sustainable liquid transportation fuel or a gasoline blendstock. SPK and/or diesel and/or naphtha may be combined with another fuel component to make a transportation fuel. The transportation fuel or gasoline blendstock may for example be used for aviation and/or vehicles. The sustainable liquid transportation fuel may for example comprise high quality diesel and/or SPK. The gasoline blendstock may for example comprise naphtha.

The desired molar ratio can be achieved without the requirement of a water gas shift reaction, as is conventionally used.

Accordingly, in one embodiment, the process according to the present invention does not include a water gas shift reaction.

However, if renewable natural gas and/or natural gas supply is limited as the feedstock, some water gas shift capacity may be included in order to achieve the desired molar ratio of $H_2$:CO.

Technologies that may be utilised in accordance with the present invention to produce the second synthesis gas may include for example, steam methane reforming (SMR) and autothermal reforming (ATR).

Other suitable reforming methods may optionally include carbon dioxide reforming and partial oxidation.

Raw synthesis gas may be produced by a reforming reaction in a reforming unit with the presence of a catalyst at high temperature and pressure.

Steam methane reforming is a non-oxidative process that converts the feedstock into hydrogen and carbon monoxide by the following reaction:

$$CH_4 + H_2O \rightarrow CO + 3H_2$$

The major products leaving the SMR unit are typically steam and raw synthesis gas. Other by products may also be formed such as carbon dioxide and solid carbon for example.

The reforming operating temperature may vary depending on the compositional characteristics of the carbonaceous feedstock and the reforming reaction that is employed.

The operating temperature of the SMR unit is preferably at least about 500° C., more preferably above 600° C., 700° C. or 800° C. The operating temperature of the SMR unit may for example be between about 500° C. and 1200° C., preferably between about 600° C. and 1100° C., or more preferably between about 700° C. and 1000° C.

It has been found that a high temperature is required to ensure a high conversion of methane to synthesis gas. It is desirable to keep the temperature constant to prolong catalyst life and improve product yield.

A high steam to carbon ratio has been found to limit the catalyst activity by coke deposition.

It has advantageously been found that if the facility is short of steam, it is possible to conduct "duct-firing" in the reforming unit in order to raise additional saturated and/or superheated steam without having to install a standalone boiler, which is desirable.

Typically, the furnace used to heat the reaction may be fired with waste off-gas from the plant facilities and may be supplemented with pipeline natural gas. However, if the carbon intensity target is proving difficult to meet, it may be possible to fire the reformer unit with renewable natural gas and offset any deficit in the carbon intensity score.

It is desirable to have a pressure within the reforming unit that will maximise methane conversion and minimise residual methane.

It is preferable for the reforming unit to have a pressure of between about 10 and 40 barg. Reforming units operating at higher pressures are known in the art. Similarly, reforming units operating at lower pressures are also known in the art. Operating at lower pressure allows for lower methane slip, thus higher methane conversion, although considerably more compression is required. All are suitable for use in the process of the present invention.

The reforming reaction may optionally be in the presence of a catalyst. The catalyst may be a metal or compounded metal catalyst with a support. The catalyst may be a heterogeneous catalyst. In one embodiment, the catalyst is nickel-based. The support may optionally be made from alumina.

The reactor in the reforming unit, for example an SMR unit, may be composed of tubes filled with solid catalyst. The tubes may be placed in a furnace that is heated to the desired temperature for the reforming reaction, for example with a gas burner.

In another embodiment the second synthesis gas may be produced by autothermal reforming. Autothermal reforming uses oxygen and carbon dioxide or oxygen and steam in a reaction with methane to form carbon monoxide and hydrogen. The autothermal reaction using oxygen and carbon dioxide can be described by the following reaction:

$$2CH_4 + O_2 + CO_2 \rightarrow 3H_2 + 3CO + H_2O$$

The autothermal reaction using oxygen and steam proceeds by the following reaction:

$$4CH_4 + O_2 + 2H_2O \rightarrow 10H_2 + 4CO$$

The molar ratio of $H_2$ to CO in the raw synthesis gas may be lower when leaving a autothermal reforming unit when compared with a steam methane reforming unit. The molar ratio of $H_2$ to CO in the raw synthesis gas will be greater when leaving an autothermal reforming unit when compared with the waste-derived synthesis gas.

For example, the molar ratio of $H_2$ to CO in the raw synthesis gas leaving the reforming unit, when the reforming unit is an ATR unit, is desirably in the range from about 1.5:1 to about 4.0:1, or preferably from about 2.0:1 to about 3.5:1, or more preferably from about 2.0:1 to about 3.0:1. The molar ratio of $H_2$ to CO in the raw synthesis gas leaving the reforming unit is most preferably about 2.4:1.

The amount of synthesis gas from the reforming unit combined with a first synthesis gas (for example waste and/or biomass derived synthesis gas) may be in an amount to achieve the desired hydrogen to carbon molar ratio. For example, a greater amount of synthesis gas from a reforming unit may be combined with a waste derived synthesis gas to meet the desired molar ratio when the reforming unit is an ATR unit compared to an SMR unit.

The combined synthesis gas feed desirably comprises $H_2$ and CO in a molar ratio in the range from about 1.5:1 to about 2.5:1, or preferably from about 1.7:1 to about 2.2:1, or more preferably from about 1.95:1 to about 2.05:1. The desired $H_2$ to CO molar ratio of the combined synthesis gas is most preferably about 2.

The inventors have found that although a greater volume of ATR-derived synthesis gas may be required for combination with the waste and/or biomass derived synthesis gas to meet the desired molar ratio when compared to SMR-derived synthesis gas, such arrangement is expected to yield a higher biogenic content in the useful product, as well as a lower overall CPAX per barrel.

This embodiment therefore provides a process with economic advantage when compared to synthesis gas solely produced from waste and/or biomass. For example, the $H_2$:CO ranges for the reforming unit may be adjusted slightly to accommodate different $H_2$:CO ratios of synthesis gas derived, in comparison to solid-derived synthesis gas which is dependent on availability and economics.

The inventors of the present invention have advantageously found that the process according to the present invention offers flexibility and allows greater control of the overall process. The flexibility of the process allows the process according to the present invention to be more reliable and optimize feed ratios.

The carbonaceous feedstock used as feed for the reforming unit may optionally be compositionally different to the carbonaceous feedstock feed used for the gasification zone.

The carbonaceous feedstock may comprise biogenic carbon.

The carbonaceous feedstock may comprise flared gas and/or single use plastics and/or fossil derived wastes.

The carbonaceous feedstock being fed into the reforming unit may be a gas.

The carbonaceous feedstock being fed into the reforming unit may for example comprise at least one of natural gas (e.g. methane), renewable natural gas, biogas, low-carbon methanol, and/or low-carbon ethanol. Preferably, the feedstock comprises a renewable natural gas.

Advantageously, renewable natural gases are a carbon neutral fuel source because they come from organic sources that once absorbed carbon dioxide from the atmosphere during photosynthesis. It is therefore desirable to use renewable natural gas where possible thereby reducing the carbon dioxide and greenhouse gas levels and thus reducing carbon intensity of the overall process.

The use of a renewable natural gas as the feedstock has been found to preserve the biogenic content of the useful product, such as transportation fuel. Therefore, where renewable natural gas is used as the feedstock to the reforming unit, the biogenic content of the resulting useful product will be greater when compared to the biogenic content of a waste-derived product only.

As a result, the resulting transportation fuel, for example, may be considered to be a partially renewable fuel, a fuel having reduced carbon intensity and/or a fuel having renewable content.

The above preferred embodiments of the present invention therefore provide a more environmentally friendly process to manufacturing a useful product when compared to conventional process in the art.

Biogas may optionally be obtained from biomass, residues or wastes by anaerobic digestion. Biogas may be optionally upgraded and/or purified to become renewable natural gas.

The feedstock may comprise at least a percentage of methane.

The term "biogenic" means sourced directly or indirectly from non-fossil organic material.

The molar percentage of methane present in the carbonaceous feedstock may optionally be at least about 50%, preferably at least about 60%, most preferably at least about 65%.

Prior to the carbonaceous feedstock entering the reforming unit, the feedstock may optionally be purified. For example, sulphur may be removed from the feedstock prior to entering the reforming unit as sulphur, if present, may otherwise poison the catalyst. It is therefore desirable to remove sulphur upstream of the reformer unit to promote prolong catalyst life and alleviate poisoning of the catalyst downstream.

Sulphur may be removed by any suitable method known by the skilled person in the art. For example, removal of hydrogen sulphide may be achieved by adsorption on fixed bed adsorbents which have a high affinity for such pollutants, for example. Adsorbents used for sulphur removal may be, for example, iron oxide, zinc oxide and/or mixed copper-zinc oxides. The resulting gas is referred to herein as "partially purified". Other components such as water, hydrocarbons, chloride (or other halides), and/or any compounds that may prove detrimental to a downstream catalyst may additionally be optionally removed from the feedstock prior to reforming.

The terms "raw synthesis gas", "oxidised synthesis gas", "clean synthesis gas", "combined synthesis gas" and any other phrase containing the term "synthesis gas" are to be construed to mean a gas primarily comprising hydrogen and carbon monoxide. Other components such as carbon dioxide, nitrogen, argon, water, methane, tars, acid gases, higher molecular weight hydrocarbons, oils, volatile metals, char, phosphorus, halides and ash may also be present. The concentration of contaminants and impurities present will be dependent on the stage of the process and carbonaceous feedstock source. It is to be understood that carbonaceous material, for example, $CH_4$ and inert gas such as $N_2$ present in the raw synthesis gas generated is expected to be carried forth through each of the subsequent steps and may not be explicitly mentioned.

The use of such terms to describe synthesis gas should not be taken as limiting. The skilled person would understand that each of the terms is construed to mean a gas primarily comprising hydrogen and carbon monoxide.

The carbonaceous feedstock for gasification may for example comprise at least one of woody biomass, municipal solid waste and/or commercial and industrial waste and/or agricultural residue. The carbonaceous feedstock will typically have fluctuating compositional characteristics that are dependent on the source and chemistry of the feedstock used.

The carbonaceous feedstock may for example be in the form of relatively large pieces. The carbonaceous feedstock may optionally be processed to remove oversized items, recyclates, highly halogenous plastics such as PVC, metals and inert items. These items cannot be converted into synthesis gas and/or are likely to a significant contaminant load (for example, the case of highly halogenous plastics); therefore it is preferable to remove said items prior to gasification. These items may optionally be recycled.

The carbonaceous feedstock may optionally be reduced to a size suitable for gasification. For example, the carbonaceous feedstock may be comminuted, shredded or chipped prior to gasification.

In some embodiments, the carbonaceous material feedstock is biomass, for example woody biomass feedstock. Example of suitable woody feedstock may include tree length round wood, pulpwood thinnings, whole tree, limbs, branches, tops and/or waste wood.

In another embodiment, the carbonaceous feedstock is waste material, for example municipal solid waste and/or commercial and industrial waste.

The carbonaceous feedstock may also be Solid Recovered Fuel (SRF) which is a waste product of relatively high calorific value typically derived from paper, card, wood, textiles and plastics.

The carbonaceous feedstock may typically comprise moisture. Preferably in that case, the carbonaceous feedstock is dried to at least some extent prior to gasification.

The carbonaceous feedstock may optionally be conveyed to a dryer to reduce the moisture content to a suitable level. The moisture content may for example be reduced to less than about 20%, preferably less than about 15% or most preferably less than about 10% by weight. Preferably, the carbonaceous feedstock supplied to the gasification zone has a moisture content of at most 10% by weight; depending on the requirements of the gasification technology deployed.

When waste material is used as the carbonaceous feedstock source, the feedstock may not need drying prior to entering the gasification zone. Waste material in this case may be fed directly into the gasifier, optionally after suitable pre-treatment to remove undesirable components and comminute the feedstock to a size suitable for feedstock handling.

The carbonaceous feedstock may optionally be continuously fed into a gasification zone.

Gasification of the carbonaceous feedstock may optionally occur in the presence of steam and oxygen.

The gasification zone may comprise a singular train, dual trains or multiple trains, for example.

Preferably, the gasification zone comprises more than one train to minimize impact of interruptions on the plant availability.

Three primary types of commercially available gasifiers are of fixed/moving bed, entrained flow, or fluidized bed type. The gasification zone may for example be an indirect gasification zone in which feedstock and steam are supplied to a gasification vessel which is indirectly heated.

In another embodiment, the gasification zone may be a direct gasification zone in which feedstock, steam and an oxygen-containing gas are supplied to the gasification vessel and directly combusted to provide the necessary heat for gasification. Also known in the art and suitable for use in the process of the present invention are hybrid gasifiers, and gasifiers incorporating partial oxidation units. In that case it will be understood that in the process of the invention the gasification zone and the partial oxidation zone may be separate zones of a single vessel.

In one embodiment, the gasification zone comprises primarily an indirectly heated deep fluidized bed operating in the dry ash rejection mode and a secondary gasifier, for maximal conversion of the carbonaceous material. In another embodiment, the gasification zone may comprise only a primary indirectly heated fluidized bed.

The fluidised bed operating temperature may vary depending on the compositional characteristics of the carbonaceous feedstock. The fluidised bed operating temperature may be between about 400 and 1000° C., preferably between about 500 and 900° C., or more preferably between about 600 to 800° C.

Such temperature ranges of the fluidised bed have been found to avoid any constituent ash from softening and forming clinkers with the bed material.

The fluidized bed reactor may optionally be preloaded with a quantity of inert bed media such as silica sand or alumina for example.

The inert bed media may optionally be fluidized with superheated steam and oxygen.

The superheated steam and oxygen may optionally be introduced through separate pipe nozzles.

During gasification, the fluidized bed may optionally undergo drying (or dehydration), devolatilization (or pyrolysis) and gasification.

Some combustion, water gas shift and methanation reactions may also occur during gasification.

It is desirable to have a pressure within the gasification zone that minimises the need of compression in downstream processes. It is therefore preferable for the gasification zone to have a pressure of at least about 3.5 bar if not higher, for example about 4 bar or more. Gasification zones operating at even much higher pressures such as 10 bar or more are known in the art. Similarly, gasification zones operating at lower pressures, for example about 1.5 bar or less are also known in the art.

The raw synthesis gas leaving the gasification zone may optionally have an exit temperature of at least about 600° C., preferably of at least about 700° C., or more preferably of at least about 800° C. Desirably, the raw synthesis gas leaving the gasification zone has an exit temperature of from about 700° C. to about 750° C.

The major products leaving the gasification zone are typically steam and raw synthesis gas comprised of hydrogen and carbon monoxide (CO) (the essential components of synthesis gas), carbon dioxide ($CO_2$), methane, and small amounts of nitrogen and argon. There may be additional tars such as benzene, toluene, ethyl benzene and xylene, higher hydrocarbons, waxes, oils, ash, soot, bed media components and other impurities present.

In order to obtain high-quality gas that is required for its use as a feedstock in downstream processes such as synthesis, it is highly desirable, at least if the downstream process involves a catalyst, to remove the impurities. Non-limiting examples include Fischer-Tropsch (FT) synthesis, ammonia synthesis, methanol synthesis, or separation as a hydrogen product.

The conversion process of the present invention may be, but is not limited to, a Fischer-Tropsch (FT) synthesis, ammonia synthesis, methanol synthesis, for example.

Carbon dioxide, sulphur, slag and other by-products and impurities of gasification may be amenable to capture, collection and reuse.

Cyclones may be used to remove undesirable solid materials from the raw synthesis gas.

A tramp discharge system may optionally be used to remove heavier contaminants from the bed material in operation of the gasification process.

The hydrogen to carbon monoxide ratio in the feed and/or term "feed ratio" is to be construed as the volume of hydrogen per volume of carbon monoxide in the relevant feed stream.

The presence of impurities can influence the processing conditions of downstream processes and further steps may be required to remove any impurities present. It is desirable to control the hydrogen to carbon monoxide ratio in the raw synthesis gas to improve the overall performance, product yield and optimisation when compared to conventional methods.

Depending on the source of carbonaceous feedstock and the gasification technology, the raw synthesis gas may for example comprise between about 3 and 40% carbon dioxide, in addition to other impurities and contaminants.

The raw synthesis gas leaving the gasification zone may typically comprise a varying sulphur concentration depending on the source of the feedstock being gasified, typically in the hundreds of ppm.

The concentration of sulphur in the raw synthesis gas will influence the process conditions that are employed downstream.

At least part of the recovered raw synthesis gas may optionally be supplied to a partial oxidation zone (POx) zone. The resulting gas leaving the POx zone is referred herein as "partially oxidised synthesis gas".

It has been found that by employing a POx zone the carbon intensity can be reduced sufficiently to allow the rest of the plant facility to be simplified, thereby benefitting the economics of the process.

Furthermore, the inclusion of a partial oxidation zone offers flexibility and gives the gasification zone the ability to the handle of a wide range of feedstock with fluctuating compositional characteristics.

It has unexpectedly been found that a partial oxidation zone is able to remove hydrocarbonaceous materials such as methane, benzene, toluene, ethyl benzene, xylene, higher hydrocarbons and other tars to an extent sufficient to allow the straightforward optional recovery downstream of carbon dioxide in a form sufficiently pure for sequestration or other use, thereby reducing the carbon intensity of the process compared with conventional WTL and BTL processes.

Conventional partial oxidation zones in the art are typically catalytic or non-catalytic (thermal).

The partial oxidation zone may optionally partially combust tail gas from a downstream synthesis unit and/or natural gas with preheated oxygen and/or steam.

The partial oxidation zone may optionally comprise a burner utilising a stream of hot oxygen.

Typically, at least some of any tars, naphthalene, higher hydrocarbons and methane present in the partial oxidation zone are converted into carbon oxides, hydrogen and water.

The partial oxidation zone may operate at a temperature of least about 1100° C., at least about 1200° C. or at least about 1300° C. for example. Preferably, the partial oxidation zone operating temperature is at least about 1300° C., more preferably in the range of from about 1200° C. to about 1350° C.

The synthesis gas fed into the partial oxidation zone is subjected to partial oxidation to produce partially oxidised synthesis gas and steam may be generated by heat exchange with the gas heated in the partially oxidation zone.

The partially oxidised synthesis gas leaving the partial oxidation zone will be hot and may optionally be cooled by generating steam. Generation of superheated steam and/or saturated high-pressure steam is desirable to improve process efficiency and reduce carbon intensity.

The partially oxidised synthesis gas optionally generates high-pressure steam in a Heat Recovery Steam Generation (HRSG) unit when exiting the POx zone. The high-pressure steam has a high energy efficiency and may optionally be recovered and recycled for use in upstream and/or downstream process which allows energy to be recovered.

Recovery of heat from POx zone may typically be radiant and convective. A simple quench approach may also be used if the carbon intensity score allows.

The partially oxidised synthesis gas may undergo a simple quench after leaving the partial oxidation zone.

The advantage of this radiant and convective heat recovery mode is the ability to have High Pressure (HP) steam (generated in a HRSG unit) available for use in the facility. While water quench is also an acceptable (and lower cost) heat recovery option, it negatively impacts the carbon intensity of the facility owing to the need to generate HP steam for users in the plant such as the gasification unit, through use of additional natural gas and/or power.

The solids may optionally be removed as a slag from the POx zone.

The raw synthesis gas from the POx zone may optionally undergo at least one of gas clean up, compression and/or sulphur removal.

The synthesis gas may optionally remove ammoniacal, sulphurous and carbon dioxide (and other acid gases) impurities, preferably sequentially, in the clean-up zone.

The overall process according to the invention may optionally include additional stages. Therefore, the synthesis gas cleaned by sequentially removing ammoniacal, sulphurous and carbon dioxide impurities may be, for example, raw synthesis gas and/or partially oxidised synthesis gas.

The cooled partially oxidised synthesis gas may optionally be passed through a venturi scrubber to remove any water and particulates such as ash and soot. A caustic wash may for example be additionally used to remove any other impurities such as ammonia, halides, nitrous oxides and remaining particulates.

The partial oxidation zone may optionally operate at a pressure slightly or somewhat lower than that of the gasification zone (to avoid any intermediate compression requirements). The partial oxidation zone may operate at a pressure of between about 2 and 3 bar for a gasification process that operates around 3.5 bar, for example.

In another embodiment, the first synthesis gas may be subjected to partial oxidation and natural gas, preferably renewal natural gas, may be combusted in the partial oxidation zone.

Optionally, a water gas shift reaction unit may be located downstream of the POx zone to increase the hydrogen content of the synthesis gas, processing for example the raw synthesis gas and/or partially oxidised raw synthesis gas.

The term "water gas shift reaction" or "WGS" is to be construed as a thermochemical process comprising converting carbon monoxide and water into hydrogen and carbon dioxide.

It has been found that the desired hydrogen to carbon monoxide molar ratio can be achieved without the requirement of a water gas shift reaction, as is conventionally used.

In preferred embodiments, the process of the present invention may not include a separate water gas shift reaction.

At least a portion of the optionally partially oxidised synthesis gas may be fed to a clean-up zone to remove contaminants to form "clean synthesis gas".

The clean-up process may, for example, be a physical absorption process, for example a solvent-based process. Suitable processes include low steam processes such as the Rectisol™ or Selexol™ processes for example.

In one embodiment, the physical absorption unit may be configured to operate a dual stage process with two separate absorber columns that contact the synthesis gas stream with methanol comprising a common methanol regeneration system. The first absorber column may selectively remove sulphur and may use a $CO_2$ saturated solvent to minimise $CO_2$ absorption in the sulphur removal column. The second absorber column may recover $CO_2$.

This technology is further described elsewhere; for example in *Fossil Fuel Emissions Control Technologies*, Bruce Miller, 2015.

Carbon dioxide may optionally be removed at this stage. Additionally, or alternatively, carbon dioxide may be removed after combining the two different synthesis gas streams.

In one embodiment, the plant may comprise two separate Rectisol™ absorber columns that contact the synthesis gas stream with methanol comprising a common methanol regeneration system. The first absorber column may selectively remove sulphur and uses a $CO_2$ saturated solvent to minimise $CO_2$ absorption in the sulphur removal column. The second absorber column may recover $CO_2$.

This arrangement allows for the selective removal of sulphur from the synthesis gas, followed by the subsequent removal of $CO_2$. At least a portion of the resulting $CO_2$ stream may be reused in the process.

Alternatively, the clean-up process may, for example, be a chemical absorption process such as an amine wash.

In variants of the invention which do not utilize a partial oxidation zone it is also desired to remove tars either by condensation prior to the sulphur removal bed or by using the physical absorption solvent to absorb tars and recovering them from the solvent regeneration stage.

The resulting synthesis gas is referred to herein as "clean synthesis gas".

Carbon dioxide may optionally be recovered in substantially pure form. The carbon dioxide may for example be essentially sulphur free.

At least a part of the recovered substantially pure carbon dioxide may optionally be sequestered. Sequestering carbon dioxide may involve separating, drying, compressing, and transporting carbon dioxide to an appropriate geologic formation where it is injected and stored permanently underground, or to a suitable end user such as, but not limited to, enhanced oil recovery, food and beverage manufacturers, $CO_2$ to chemical and fuel conversions, for example.

Additionally, or alternatively, at least a part of the recovered carbon dioxide may optionally be used for upstream and/or downstream processes, with minimal clean up required.

Carbon dioxide produced may also contribute to the carbon intensity and economics of the overall process. The source and the nature of the carbon dioxide produced will affect the carbon intensity of the process. For example, when natural gas is used as the feedstock for the reforming process, any carbon dioxide formed will have a fossil origin. Alternatively, carbon dioxide formed from biogas is a result of the biodegradation of green waste or agro-food waste and therefore has no fossil origin. There would therefore be no additional fossil carbon dioxide formed or greenhouse gas emissions to the atmosphere when carbon dioxide is formed from a renewable source thereby improving the carbon intensity of the overall process.

The raw synthesis gas derived from reforming may contain substantially lower concentrations of $CO_2$ than waste derived synthesis gas. The synthesis gas produced from the reforming reaction may optionally be combined with the waste and/or biomass derived synthesis gas after the waste and/or biomass derived synthesis gas has undergone $CO_2$ removal using a process as described above, for example the $CO_2$ stream may be reused in the process and/or sequestered. At least a portion of $CO_2$ from the waste and/or biomass derived synthesis gas may be removed prior to combining with the synthesis gas derived from reforming.

In addition, or alternatively, at least a portion of the resulting $CO_2$ stream of the combined synthesis gas (i.e. waste derived synthesis gas and synthesis gas derived from reforming) may be reused in the process and/or sequestered. The combined synthesis gas and/or the synthesis gas derived from reforming may undergo $CO_2$ removal.

Removal of $CO_2$ from the combined synthesis gas and/or the synthesis gas produced from reforming may have significant impact on the carbon intensity of the process and improving the overall economics of the facility.

The process according to the above embodiment of the present invention therefore provides a lower emissions route to a useful product when compared to a process that solely utilises solely waste derived synthesis gas.

The power consumption per unit of produced reformed-derived syngas, for example SMR-derived syngas, is considerably lower than the power consumption per unit of syngas derived from a waste gasifier. The overall power import requirement of the process according to the invention is therefore expected to be lower compared to sole use of a waste gasifier. The present invention therefore provides a more cost-effective route to the manufacture of a useful product.

Conventionally, a water gas shift (WGS) reaction follows a gasification or reforming process. However, in preferred embodiments the process of the present invention may omit a separate water gas shift reaction.

It has been found that the process according to the present invention (i.e. a co-fed plant) has a higher carbon and thermal efficiency when compared to a plant that is solely fed waste.

Furthermore, it may be possible to set up the reforming unit earlier than the gasification zone, POx zone, clean-up zone etc system. This may advantageously enable earlier production of the useful product, whilst the waste and/or biomass derived syngas production infrastructure is still under construction.

As there are several separate units in conventional processes, the presence of a reforming process in the present invention will enable a faster route to FT liquid product if there were to be a trip in the plant.

The reforming unit may operate autonomously. Thus, the process of the present invention may be workable during downtime and/or interruption in the gasification zone thereby improving the overall reliability and availability of the process.

Additionally, once the reforming system and FT system are both online, the stream constraints may be eased.

The products formed by a process according to the first aspect of the present invention may for example constitute cleaner versions of fuels formed by conventional processes, i.e. renewable fuel.

Also provided herein is a plant configured to operate the process according to the first aspect of the present invention.

Also provided herein is a useful product produced by a process according to the first aspect of the present invention.

For avoidance of doubt, all features relating to the process for manufacture of a useful product having a desired hydrogen to carbon monoxide molar ratio, also relate, where appropriate, the plant configured to operate the process and vice versa.

BRIEF DESCRIPTION OF THE DRAWINGS

Preferred embodiments of the invention are described below by way of example only with reference to FIGS. 1 and 2 of the accompanying drawings, wherein.

DETAILED DESCRIPTION

Figure 1:
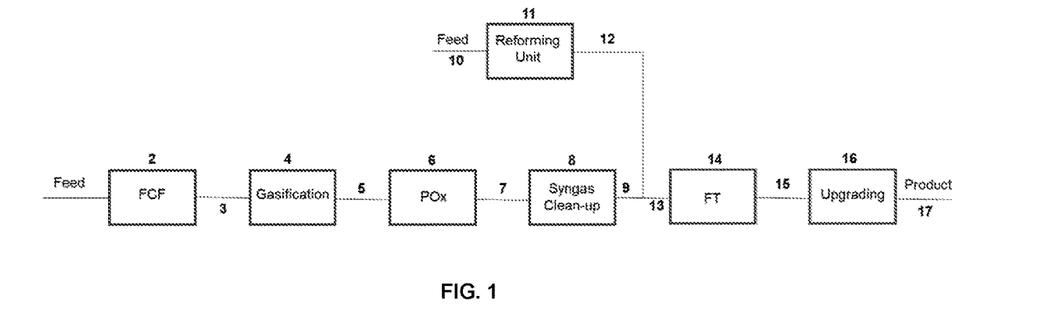
FIG. 1 is a simplified schematic diagram of a process for undertaking FT synthesis from a biomass and/or waste feedstock and renewable natural gas in accordance with a preferred embodiment of the invention.

Referring to FIG. 1, a first carbonaceous feedstock is supplied in line 1 to Fuel Conditioning Facility (FCF) 2 and on in line 3 to gasification zone 4. Raw synthesis gas from gasification zone 4 is passed in line 5 to partial oxidation zone 6. Partially oxidised raw synthesis gas passes on in line 7 to gas clean-up zone 8, generating first clean synthesis gas in line 9.

A second carbonaceous feedstock is supplied in line 10 to reforming unit 11, which may be a steam-methane reformer or an autothermal reformer. Raw synthesis gas from reforming unit 11 is passed in line 12 to combine (line 13) with the clean synthesis gas from line 9. All or a portion of the combined synthesis gas in line 13 is fed to Fischer-Tropsch (FT) reactor train 14 and the resulting FT products are fed in line 15 to upgrading zone 16, generating a useful product stream in line 17.

Means are provided for controlling the amount of synthesis gas from reforming unit 11 that is combined with the waste derived synthesis gas from clean-up zone 8.

This embodiment involves the supplementing of waste-derived synthesis gas (which in the VLS scheme has a low $H_2$:CO ratio of approximately 0.9) with hydrogen rich gas from a steam methane reformer (SMR) or autothermal reformer (ATR). Several different feedstocks could be considered for the reforming unit 11 with the most common being natural gas. Renewable Natural Gas (RNG) is the preferred feedstock.

Thus, the low $H_2$:CO ratio syngas from waste gasification is combined with the high $H_2$:CO ratio from the reforming unit 11 to produce a syngas that meets the $H_2$:CO of approximately 2.00 requirement for Fischer-Tropsch synthesis.

It is possible to combine gasification and reforming unit-derived syngas streams to meet the $H_2$:CO=2.00 specification without any separate water gas shift unit. If renewable natural gas (RNG) or natural gas (NG) supply is limited, it is possible that some water gas shift capacity is included in order to meet the FT requirements.

The syngas from the reforming unit 11 contains substantially lower concentrations of $CO_2$ than the waste-derived syngas from line 9. Accordingly, it may be advantageous to remove $CO_2$ from the latter. If there is economic incentive to capture and sequester the $CO_2$, it may make sense to send the combined gasification and reformed syngas streams through a $CO_2$ removal stage.

There are several Carbon Intensity (CI) benefits arising from this scheme including:
- a) if Renewable Natural Gas (RNG) is used as the process feed 10 to the reforming unit 11, the biogenic content of the final fuels will increase relative to the biogenic content of a waste-derived product only;
- b) if Renewable Natural Gas (RNG) is used as the process feed 10, the feedstock will be deemed to be renewable;
- c) the power consumption per unit of produced reforming unit-derived syngas is considerably lower than that from a waste gasifier, reducing the power import requirements.

The reforming unit 11 can be fired with waste off gases from the facility and supplemented with pipeline Natural Gas (NG). Should it be difficult to meet the CI target (if, for example, the average CI of the UK grid did not decrease as rapidly as predicted) it is possible to fire the SMR unit with RNG and make up any deficit on the CI score.

Where RNG is used as the process feed to the reforming unit, the RNG feed relaxes the CI constraints and enables other cost saving modifications, such as simplification of the POx heat recovery scheme; and possible elimination of the entire internal power generation island.

The waste/NG co-fed plant of FIG. 1 would be expected to have a higher carbon and thermal efficiency than a plant that is fed only by waste.

The reforming unit 11 produces a wastewater (often referred to as "process condensate") which can be readily upgraded to boiler feed water. The availability of this high-quality water can be used to offset the relatively high-water intake that it required to drive the gasification process.

Other advantages of the process scheme according to the present invention are as follows:
  a) Early Facility Start-Up It may be possible to start-up the reforming unit 11 earlier than the FCF-gasifier-POx-gas clean-up system. This will enable earlier production of final products, whilst the waste syngas production infrastructure is still under construction.
  b) Faster Start-Up The reforming unit 11 enables a faster route to FT liquid production following a trip. Once the reforming unit 11 and FT process 14 are online, the steam constraints are eased considerably too.

c) Availability

The reforming unit 11 is expected to have a considerably higher overall availability than the equivalent waste gasification train. As a result, one could reasonably expect a good increase in the overall plant availability. For example, in the case of expected and/or unexpected gasification interruption, the process according to the present invention will allow for sustained operation through either recycled tail gas to the reforming unit 11 to achieve the desired $H_2$:CO ratio or once through operation of the FT unit. Both of these conditions can be achieved under dynamic operation conditions through feedback control loops or operator intervention. Additionally, operation of the reforming unit 11 (i.e. SMR or ATR unit) to produce $H_2$ can be used to operate downstream product upgrading equipment without the gasifier online.
  d) Syngas Quality Major contaminants in the syngas from the reforming unit 11 are expected to be $NH_3$ and to a much lesser extent, HCN. Sulphur is removed upstream of the reforming unit 11, as sulphur will poison the nickel reforming catalyst. By comparison, the waste-derived gas will contain a host of potential FT catalyst poisons. Introduction of the RNG derived gas is expected to dilute these waste-derived poisons and thereby reduce the risk of off-spec syngas to the FT process 14.
  e) Steam Raising If the facility is found to be short of steam, it is possible to consider "duct-firing" in the reforming unit 11 in order to raise additional saturated and/or superheated steam without having to install a standalone boiler.

Although this embodiment utilises RNG as the feedstock for the reforming unit 11, other carbonaceous materials can be fed into this reformer too including low carbon methanol, ethanol and higher hydrocarbons, providing the carbon intensity intention allows.

In a variant in which the reforming unit 11 is an oxygen-blown autothermal reformer (ATR), a synthesis gas with an $H_2$:CO ratio of approximately 2.40 is generated in line 12. When the reforming unit 11 is an SMR unit, the SMR syngas has a ratio of approximately 4.50. Therefore, more ATR-derived syngas will be blended with the waste-derived syngas to meet the target $H_2$:CO ratio of 2.00, when compared to SMR-derived syngas. This is expected to yield a higher biogenic content in the final product as well as a lower overall CAPEX and OPEX per barrel. The downside will be the considerable volume of RNG required to balance the facility.

Figure 2:
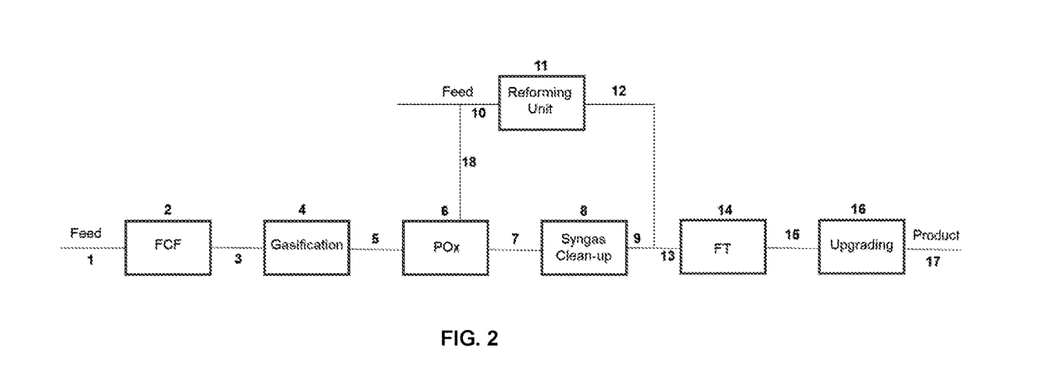
FIG. 2 is a simplified schematic diagram of a variant of the process of FIG. 1.

In the embodiment of FIG. 2, the carbonaceous feedstock fed to the reforming unit, for example natural gas and/or renewable natural gas, is additionally supplied to the POx zone and thereby reduces the constraints on the plant.

Referring to FIG. 2, a first carbonaceous feedstock is supplied in line 1 to Fuel Conditioning Facility (FCF) 2 and on in line 3 to gasification zone 4. Raw synthesis gas from gasification zone 4 is passed in line 5 to partial oxidation zone 6. A second carbonaceous feedstock is supplied in line 18 to partial oxidation zone 6. Several different feedstocks could be considered for the second carbonaceous feedstock, with the most common being natural gas. Renewable Natural Gas (RNG) is the preferred feedstock. Partially oxidised raw synthesis gas passes on in line 7 to gas clean-up zone 8, generating first clean synthesis gas in line 9.

The second carbonaceous feedstock that is supplied to partial oxidation zone 6 is also supplied in line 10 to reforming unit 11, which may be a steam-methane reformer or an autothermal reformer. Raw synthesis gas from reforming unit 11 is passed in line 12 to combine (line 13) with the clean synthesis gas from line 9. All or a portion of the combined synthesis gas in line 13 is fed to Fischer-Tropsch (FT) reactor train 14 and the resulting FT products are fed in line 15 to upgrading zone 16, generating a useful product stream in line 17.

Means are provided for controlling the amount of synthesis gas from reforming unit 11 that is combined with the waste derived synthesis gas from clean-up zone 8.

Means are provided for controlling the amount of second carbonaceous feedstock that is fed to partial oxidation zone 6.

The invention claimed is:

1. A process for the manufacture of a useful product from synthesis gas having a desired hydrogen to carbon monoxide molar ratio comprising:
    gasifying a first carbonaceous feedstock comprising waste materials and/or biomass in a gasification zone to produce a first synthesis gas;
    partially oxidising the first synthesis gas in a partial oxidation zone to generate oxidised synthesis gas;
    reforming a second carbonaceous feedstock comprising renewable natural gas to produce a second synthesis gas, in which reforming the carbon monoxide content and the hydrogen content are both increased, the second synthesis gas having a different hydrogen to carbon monoxide ratio from that of the first synthesis gas;
    combining at least a portion of the first partially oxidised synthesis gas and at least a portion of the second synthesis gas in an amount to achieve the desired hydrogen to carbon monoxide molar ratio and to generate a combined synthesis gas;
    subjecting at least part of the combined synthesis gas to a conversion or separation process effective to produce the useful product.

2. The process according to claim 1 wherein the second synthesis gas has a higher hydrogen to carbon monoxide molar ratio than the first synthesis gas.

3. The process according to claim 1 wherein the reforming step is at least one of steam methane reforming and autothermal reforming.

4. The process according to claim 1 wherein at least a portion of one or more of the partially oxidised first synthesis gas, the second synthesis gas and the combined synthesis gas is decontaminated in a clean-up zone.

5. The process according to claim 3 wherein the reforming step is in the presence of a catalyst, optionally wherein the catalyst is nickel-based.

6. The process according to claim 1 wherein the second carbonaceous feedstock is a gas.

7. The process according to claim 1 wherein the process is workable during downtime and/or interruption in the gasification zone.

8. The process according to claim 1 wherein the second carbonaceous feedstock further comprises at least one of natural gas, biogas, low-carbon methanol and low carbon ethanol.

9. The process according to claim 1 wherein the first carbonaceous feedstock comprises at least one of woody biomass, municipal solid waste and commercial and/or industrial waste and/or agricultural residue.

10. The process according to claim 1 wherein the desired hydrogen to carbon molar ratio of the combined synthesis gas is from 1.5:1 to about 2.5:1.

11. The process according to claim 1 wherein ammoniacal, sulphurous and carbon dioxide impurities are removed in the clean-up zone.

12. The process according to claim 1 wherein sulphur is removed from the second carbonaceous feedstock prior to the reforming step.

13. The process according to claim 1 wherein $CO_2$ is removed from the first synthesis gas prior to combination with the second synthesis gas, and/or from the combined synthesis gas.

14. The process according to claim 1 wherein the process does not include any water gas shift reaction.

15. The process according to claim 1 wherein the useful product is produced by subjecting at least part of the combined synthesis gas to a Fischer-Tropsch synthesis or ammonia synthesis or methanol synthesis.

16. The process according to claim 15 wherein the combined synthesis gas is converted by Fischer-Tropsch synthesis into liquid hydrocarbons.

17. The process according to claim 16 wherein the liquid hydrocarbons are upgraded into the useful product.

18. The process according to claim 17 wherein at least a part of the liquid hydrocarbons are upgraded by at least one of hydroprocessing, product fractionation, hydrocracking and/or isomerisation to produce the useful product.

19. The process according to claim 1 wherein the useful product comprises synthetic paraffinic kerosene and/or diesel and/or naphtha,
    wherein the synthetic paraffinic kerosene and/or diesel and/or naphtha is combined with another fuel component to make a transportation fuel.

20. The process according to claim 19 wherein the biogenic content of the useful product is greater than the biogenic content of a useful product derived from the first carbonaceous feedstock only.

21. The process according to claim 1 wherein the first synthesis gas is subjected to partial oxidation and steam is generated by heat exchange with the gas heated in the partial oxidation zone.

22. The process according to claim 1 wherein the partially oxidised synthesis gas undergoes a simple quench after leaving the partial oxidation zone.

23. The process according to claim 1 wherein the first synthesis gas is subject to partial oxidation and carbon dioxide is recovered downstream of the partial oxidation zone.

24. The process according to claim 1 wherein the first synthesis gas is subjected to partial oxidation and natural gas is combusted in the partial oxidation zone.

25. The process according to claim 1 wherein the first synthesis gas is subjected to partial oxidation at a temperature of least about 1100° C.

* * * * *